United States Patent
Young et al.

(10) Patent No.: US 7,347,439 B2
(45) Date of Patent: Mar. 25, 2008

(54) NON-ROTATING BICYCLE WHEEL DISPLAY DISK

(76) Inventors: Scott James Young, 3300 Osage St., Denver, CO (US) 80211; Mark Eugene Young, 215 Centre St., New York, NY (US) 10013; Todd Harrison Hutcheson, 135 Perry St., No. 12, New York, NY (US) 10014

( * ) Notice: Subject to any disclaimer, the term of this patent is extended or adjusted under 35 U.S.C. 154(b) by 0 days.

(21) Appl. No.: 11/066,420

(22) Filed: Feb. 25, 2005

(65) Prior Publication Data

US 2005/0206123 A1 Sep. 22, 2005

Related U.S. Application Data

(60) Provisional application No. 60/547,472, filed on Feb. 25, 2004, provisional application No. 60/547,467, filed on Feb. 25, 2004.

(51) Int. Cl.
*B62J 39/00* (2006.01)
*G09F 21/04* (2006.01)

(52) U.S. Cl. ..................... 280/288.4; 40/587

(58) Field of Classification Search ............. 280/288.4, 280/152.1, 152.2, 152.3, 852, 160, 160.1; 40/587; 301/37.105, 37.25, 37.41
See application file for complete search history.

(56) References Cited

U.S. PATENT DOCUMENTS

| | | | | | |
|---|---|---|---|---|---|
| 1,478,475 | A | | 12/1923 | Jago et al. ..................... 40/587 |
| 2,548,070 | A | * | 4/1951 | Ryan ............................ 40/587 |
| 2,869,262 | A | * | 1/1959 | Lucas .......................... 40/587 |
| 3,004,798 | A | * | 10/1961 | Tylle ..................... 301/37.104 |
| 3,103,369 | A | * | 9/1963 | Gaines et al. ................. 280/63 |
| 4,202,582 | A | | 5/1980 | Seltman ........................ 301/37 |
| 4,280,293 | A | | 7/1981 | Kovalenko .................... 40/587 |
| 4,418,962 | A | | 12/1983 | Schaffer ....................... 301/37 |
| 4,660,893 | A | * | 4/1987 | Huntzinger .............. 301/37.41 |
| 4,678,239 | A | | 7/1987 | Matsushita ............... 301/37.25 |
| 4,682,821 | A | * | 7/1987 | Strazis ................... 301/37.42 |
| D293,233 | S | * | 12/1987 | Berg ......................... D12/204 |
| 4,712,838 | A | | 12/1987 | Berg et al. ..................... 301/37 |
| 4,729,604 | A | | 3/1988 | Dietz .......................... 301/37 |
| 4,836,615 | A | * | 6/1989 | Berg et al. ............... 301/37.41 |

(Continued)

OTHER PUBLICATIONS

Bicycles & Tricycles—Archibald Sharp (1977) Dover Books, pp. 232,245,346,433.

*Primary Examiner*—Lesley D. Morris
*Assistant Examiner*—Marc A. Scharich
(74) *Attorney, Agent, or Firm*—Gottlieb, Rackman & Reisman, P.C.

(57) ABSTRACT

The present invention describes a non-rotating bicycle wheel display assemblies that remains absolutely upright in relation to the rotation of a bicycle wheel and in relation to a parked bicycle wheel. The invention consists of a pair of disk assemblies mounted to both sides of a conventional bicycle wheel and turn, to the front and rear of a bicycle frame. The disk assemblies are manufactured of a lightweight inexpensive material that is formed to the convex shape of an outer surface of the bicycle wheel and includes an overmolded, captive friction bearing made of a high density, self lubricating plastic. A plastic retaining mechanism is secured to an outer disk fascia and a bicycle frame member to hold the outer disk in an upright position at all times whether the bicycle is in motion or in repose.

1 Claim, 6 Drawing Sheets

U.S. PATENT DOCUMENTS

| | | | |
|---|---|---|---|
| 4,969,693 A * | 11/1990 | Molson | 301/37.11 |
| 4,978,174 A * | 12/1990 | Nosler | 301/37.11 |
| 5,131,727 A | 7/1992 | Johnson | 301/37 |
| 5,490,342 A | 2/1996 | Rutterman et al. | 40/587 |
| 5,588,715 A | 12/1996 | Harlen | 301/37 |
| 5,603,553 A * | 2/1997 | Klieber et al. | 301/37.41 |
| 5,659,989 A | 8/1997 | Hsiao | 40/587 |
| 5,957,542 A | 9/1999 | Boothe et al. | 301/37 |
| 6,120,104 A | 9/2000 | Okamoto et al. | |
| 6,164,678 A | 12/2000 | Fryer | 280/304 |
| 6,568,110 B2 | 5/2003 | Lee et al. | 40/587 |
| 6,793,294 B2 * | 9/2004 | Shih | 301/37.41 |
| 6,942,302 B2 * | 9/2005 | Osterlund et al. | 301/37.105 |

* cited by examiner

NON-ROTATING BICYCLE WHEEL DISPLAY DISK

CROSS REFERENCE TO RELATED APPLICATIONS

Reference to:

U.S. Provisional Patent Application 60/547,472 file on Feb. 25, 2004

U.S. Provisional Patent Application 60/547,467 file on Feb. 25, 2004

STATEMENT OF FEDERALLY SPONSORED RESEARCH/DEVELOPMENT

"Not Applicable"

SEQUENCE LISTING

"Not Applicable"

BACKGROUND OF INVENTION

The present invention relates generally to a pair of bicycle wheel covers, and more particularly to a pair of lightweight non-rotating bicycle wheel display assemblies that remain absolutely upright in relation to the rotation of a bicycle wheel and in relation to a parked bicycle wheel.

Bicycles are a popular mode of transportation and recreation. As their main means of use is out of doors this creates a vast commercial opportunity as an advertising display medium. Advertising on bicycles is not a new concept nor are wheel covers.

Wheel display assemblies or "shrouds" on bicycles have been used for aerodynamics, safety and aesthetic purposes. The problem arriving with this type of display is that it is not, readable as the bicycle is in motion when imprinted with a message. Additionally, the display is inevitably not upright after the bicycle has been parked.

The use of a counterweights to inhibit rotation of wheel display disks or covers is known on motor vehicles, but are ineffective in many ways regarding a bicycle application; a bicycle, requires balance of the wheels, frame, and rider, and counterweights will fight against this and can result in a very dangerous situation; bicycles need to he light weight; spacing tolerances on a rear wheel of a bicycle rim are at a minimum due to a rear sprocket, gears, or brake and can not accommodate a counterweight; a counterweighted wheel cover does not remain absolutely still during riding and tend to oscillate at braking; counterweights are inherently unstable.

Importantly, U.S. Pat. No. 4,729,604 (Dietz) discloses a "wheel shroud" designed as a single plastic cover with means to access the air valve of a bicycle wheel.

U.S. Pat. No. 4,418,962 (Schaffer) describes a ridged spoked wheel cover, much like the above described patent, primarily for decorative purposes.

U.S. Pat. No. 4,712,838 (Berg, et al.), as well as U.S. Pat. No. 4,969,693 (Molson) both disclose a non ridged cover attached to a bicycle wheel. U.S. Pat. No. 3,602,550 indicates a decorative wheel cover which includes an appliqué type of design, as the above referenced patents, it rotates with the wheel.

A bicycle wheel cover used for safety against the spoked region of a bicycle wheel is disclosed in U.S. Pat. No. 4,202,582 (Seltman).

A bicycle wheel cover disclosed in U.S. Pat. No. 5,131,727 (Johnson) is used for aerodynamic purposes and is also a single cover.

Disclosed within U.S. Pat. No. 6,568,110 (Lee, et al.) is described various uses for a non rotating display using a counterweight and a friction prevention unit including, but not limited to, a vehicle.

U.S. Pat. No. 5,490,342 describes a Non-rotating wheel cover use on automobiles and other motorized vehicles using a counter weight, as does U.S. Pat. No. 5,659,989, U.S. Pat. No. 5,588,715, U.S. Pat. No. 4,678,239 (Matsushita) and U.S. Pat. No. 6,120,104 (Okamoto).

Other Prior art disclosing non-rotating vehicle wheel displays Include: U.S. Pat. No. 4,280,293 (Kovalenko), U.S. Pat. No. 6,164,678 (Fryer), U.S. Pat. No. 5,957,542 (Boothe, et al.) and U.S. Pat. No. 1,478,475 (Jago, et al.)

It is therefore apparent that the present invention discloses a pair of display wheel assemblies that, when attached to a bicycle wheel and in turn to a bicycle, forward or rear, create an absolute motions upright display surface unlike any of the above described inventions.

SUMMARY OF INVENTION

The present invention relates generally to a pair of bicycle Wheel display assemblies and more particularly, to a pair of lightweight non-rotating display bicycle wheel display assemblies that remain absolutely upright in relation to the rotation of the bicycle wheel and in relation to a parked bicycle wheel.

Inertia of the outer display disks is achieved through the use of a ridged adjustable retaining mechanism attached to the outer edge of the disks and a bicycle frame member on both sides of a bicycles front and back wheels.

To maintain longevity, minimal thickness, correct spacing and centering of the two disk per wheel side assembly, a lightweight, two part plastic bearing is utilized. A large diameter hole in the middle of each display disk, where the bearing resides, accommodates the passing through of the bicycle's wheel hub and skewer assembly.

Display disks are printed as to display advertising or graphic images on the outer face, or the inner face and back wheel mounted disc, in the event that the outward facing disks are manufactured from a clear sub-straight. Display disks range in diameter to accommodate various wheel sizes from small children's bicycles to adult sized bicycles, so as to completely cover the spoke area of the wheel to the inner rim edge. The outward facing display disk may also be cut into various shapes depicting products or images and inturn the shapes attached to the ridged adjustable retaining mechanism/bicycle frame member.

A notch is introduced into the outer edge of each backing disk to accommodate a bicycle automobile roof mounting system or a antitheft device opposite of which a hole is located to facilitate adding air to the air valve.

DETAILED DESCRIPTION OF THE INVENTION

Figure 1:
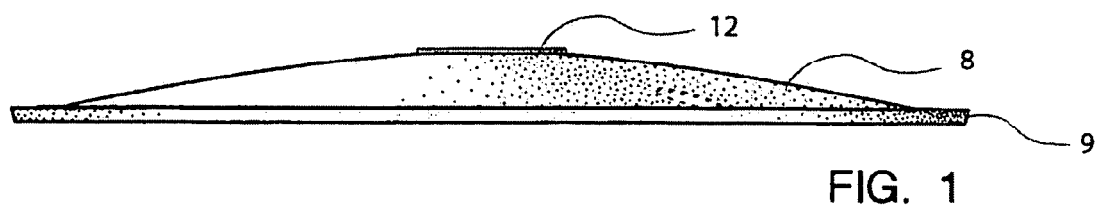
FIG. 1. is a side elevation view of one half of a bicycle wheel display disk assembly.
Figure 2:
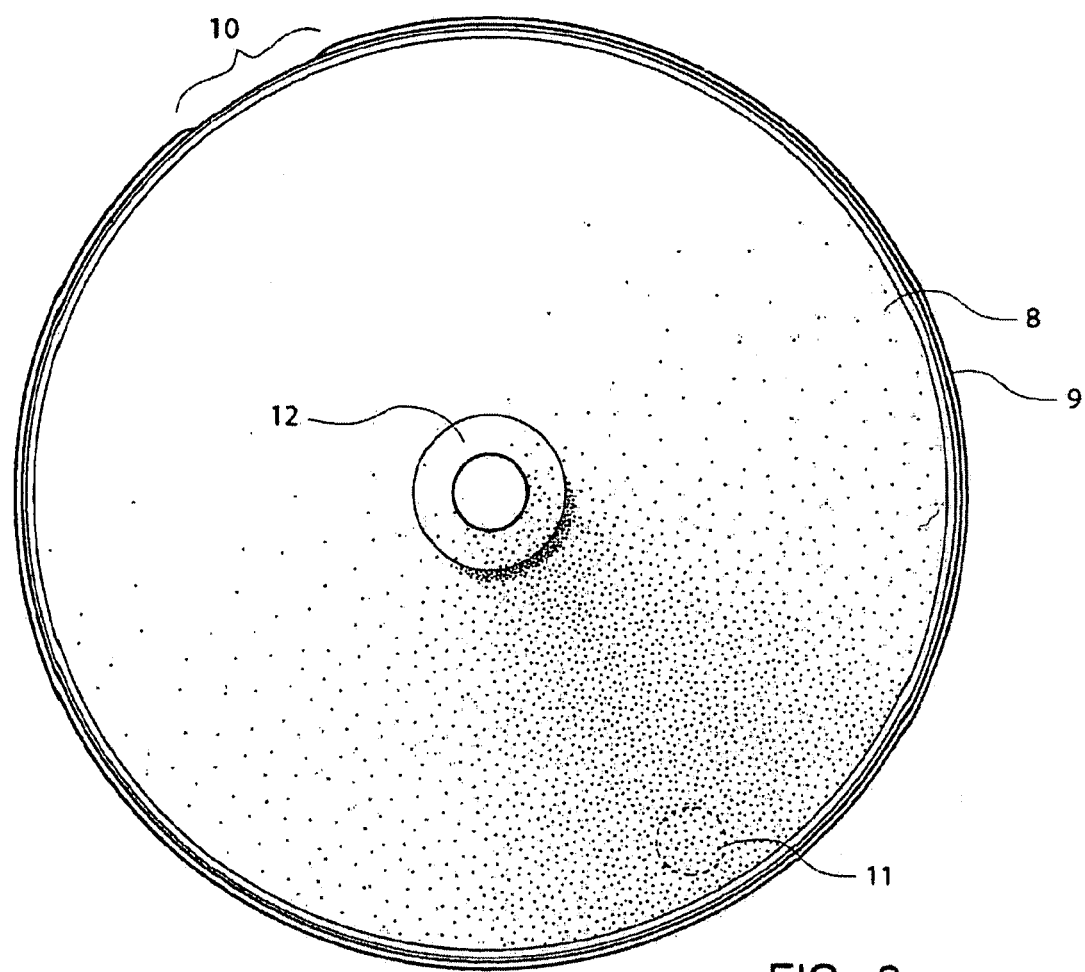
FIG. 2. is a front view of one half of a bicycle wheel display disk.

Referring now to the drawings, the preferred embodiment of the invention, is shown in FIGS. 1 through 8.

Turning to FIG. 1 we see a visual surface of a circular outer convex disk 8 nested within a raised outer circumference edge of an inner circular base disk 9 with an overmolded plastic bearing assembly 12 holding the base disk 9 and the outer convex disk 8 into position and centering both circular disks. As seen in FIG. 1, the raised edge is created by the outer edge of the base disk 9 being turned upward to nest the outer convex disk 8 into place and protect a leading edge of the outer convex disk 8. The raised edge of the base disk 9 is interrupted by a slight notch 10 to create an access point for the use of a bicycle automobile roof mounting system or an antitheft device, such as a bicycle lock. A hole 11 inset from a periphery of the base disk 9 is located directly opposite of the notch 10 to facilitate adding air into an air valve stern. The hole 11 is accessed by slightly lifting the outer convex disk 8 and inserting an air hose.

Figure 3:
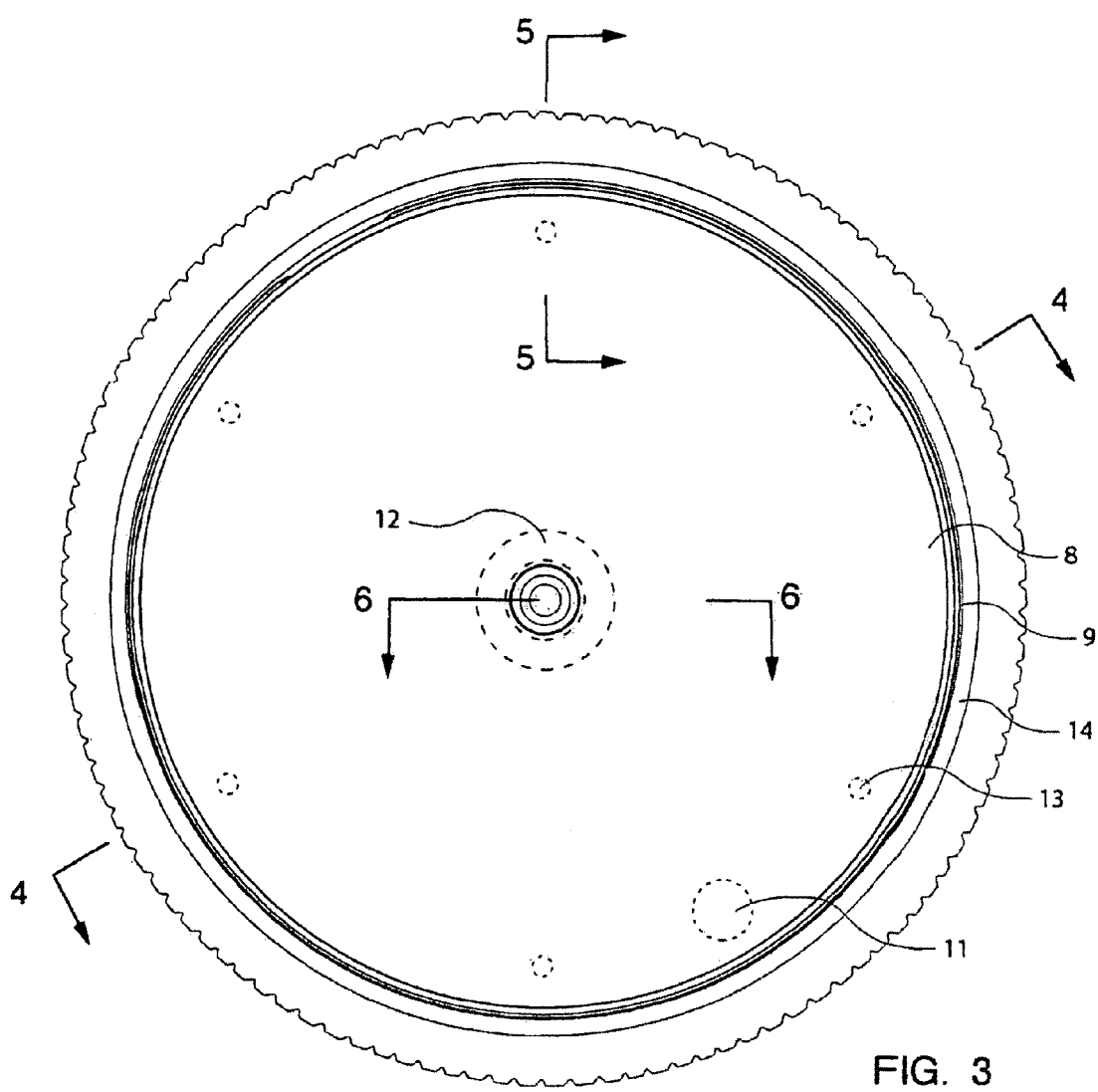
FIG. 3. is a front view of display disk as mounted to typical bicycle spoke and wheel assembly.

Moving to FIG. 3, we see the invention mounted to a bicycle wheel and tire assembly. The outer disk completely covers a plurality of mounting holes 13 and the valve stein access hole 11. By keeping the outer surface clean of these components the function of the base disk 9 becomes unseen.

Figure 4:
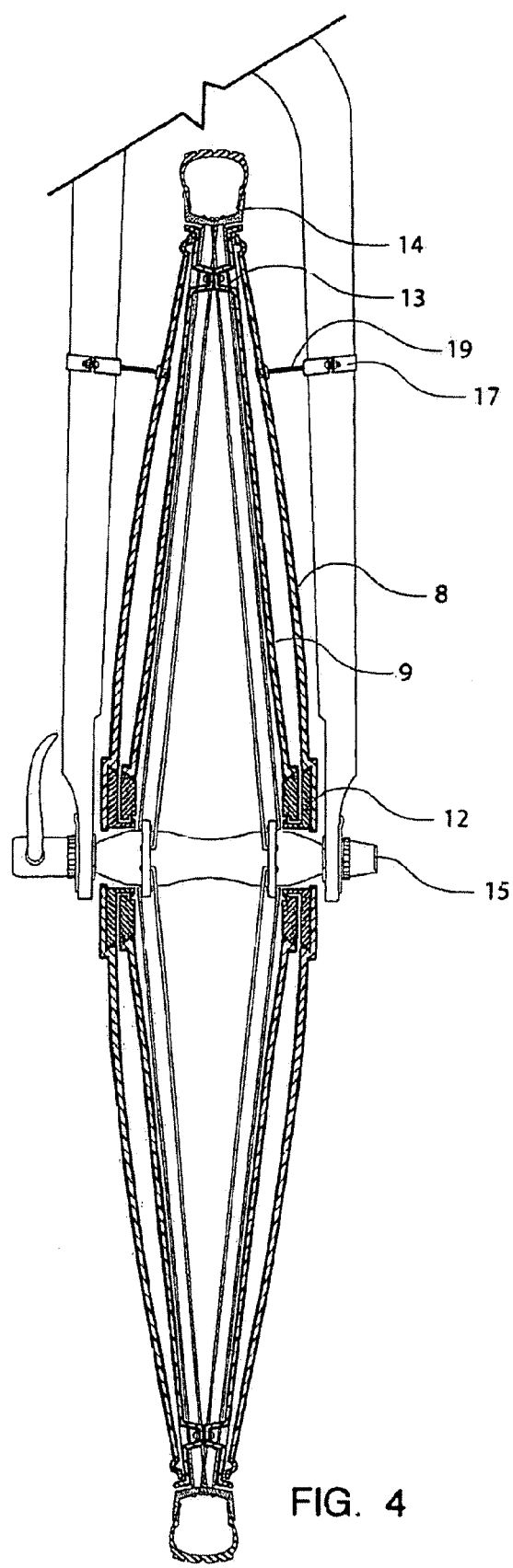
FIG. 4. is a full side section of display disk as mounted to a bicycle frame inturn mounted to a typical bicycle spoke and wheel assembly showing bearing assembly location.
Figure 5:
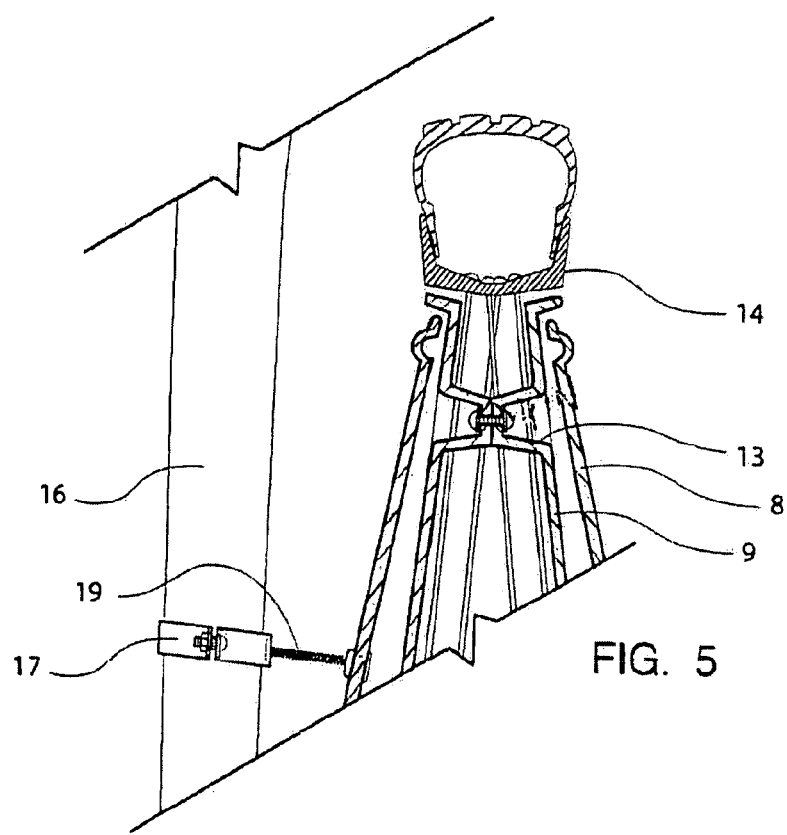
FIG. 5. is a detailed section view of display disk as mounted to typical bicycle spoke and wheel assembly showing mechanical attachment to bicycle frame.
Figure 6:
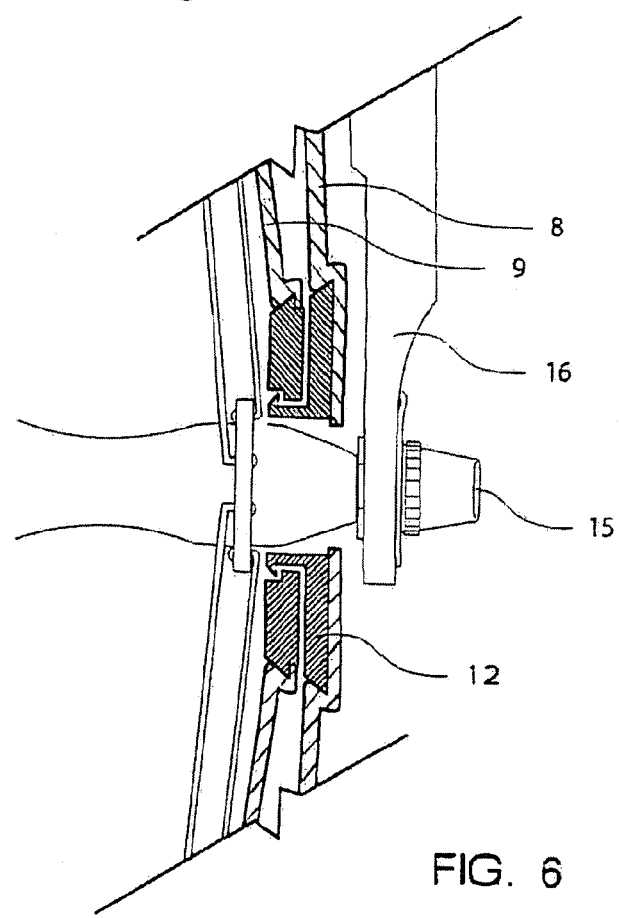
FIG. 6. is a detailed section view of display disk showing bearing assembly.

Following onto FIG. 4 one sees the heart of the invention, a two part machined or injection molded bearing 12 made of self lubricating plastic such as HMEW or comparable. This bearing is manufactured in two pails and consists of a female inner portion and a male outer portion with a barbed end to create a positive locking surface. The bearing are in turn overmolded into circular outer convex disk 8 and inner circular base disk 9 creating a captive type of connection, This is also well illustrated within FIG. 6. The size of the beating is critical in this application due to the tolerance constraints between wheel and frame, wheel and gear cassette, wheel and coaster break, etc. The display disk assemblies are manufactured with a dimension to fit both front and rear wheels of a bicycle.

Inertia of the outer display disks is achieved through the use of a ridged adjustable retaining mechanism 19 attached to the outer edge of the disks and a bicycle frame member, using either a welded on wire boss or a wrap around retainer 17 on both sides of a bicycle frame 16. Ridged adjustable retaining mechanism 19 is constructed of a ridged plastic, such as PVC, which enables circular outer convex disk 8 to stay in an absolute upright position at all time, whether the bicycle is in motion or in repose. Ridged adjustable retaining mechanism 19 is manufactured in such a way as to self-destruct if any portion of the assembly such as circular outer convex disk 8 becomes bound to another surface or a outside force making the assembly unsafe.

The stability of the outer convex disk and it's use on a bicycle is unique to the invention.

Figure 7:
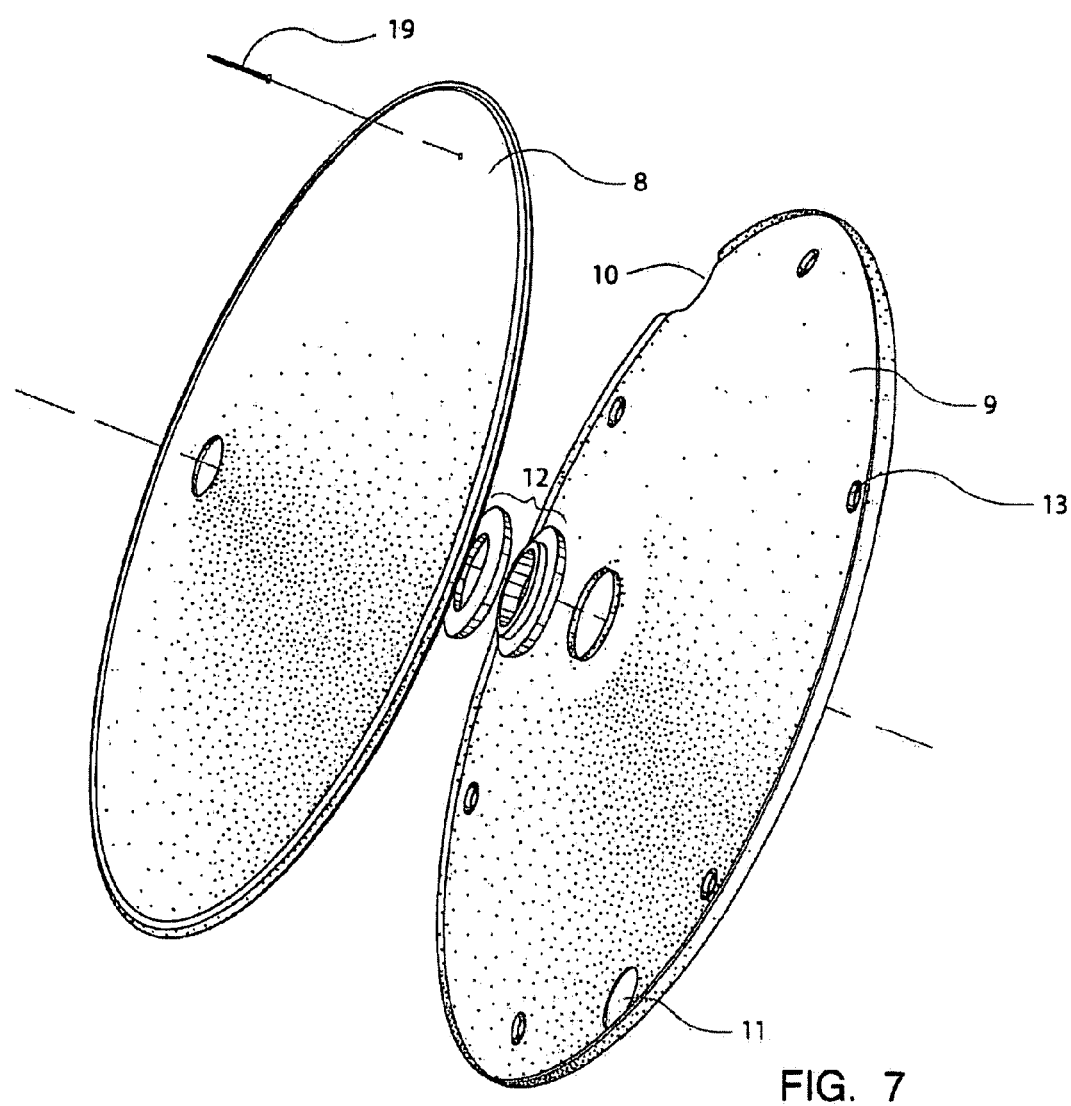
FIG. 7. is an exploded view of display disk assembly showing back mounting disk, bearing assembly and front display disk.
Figure 8:
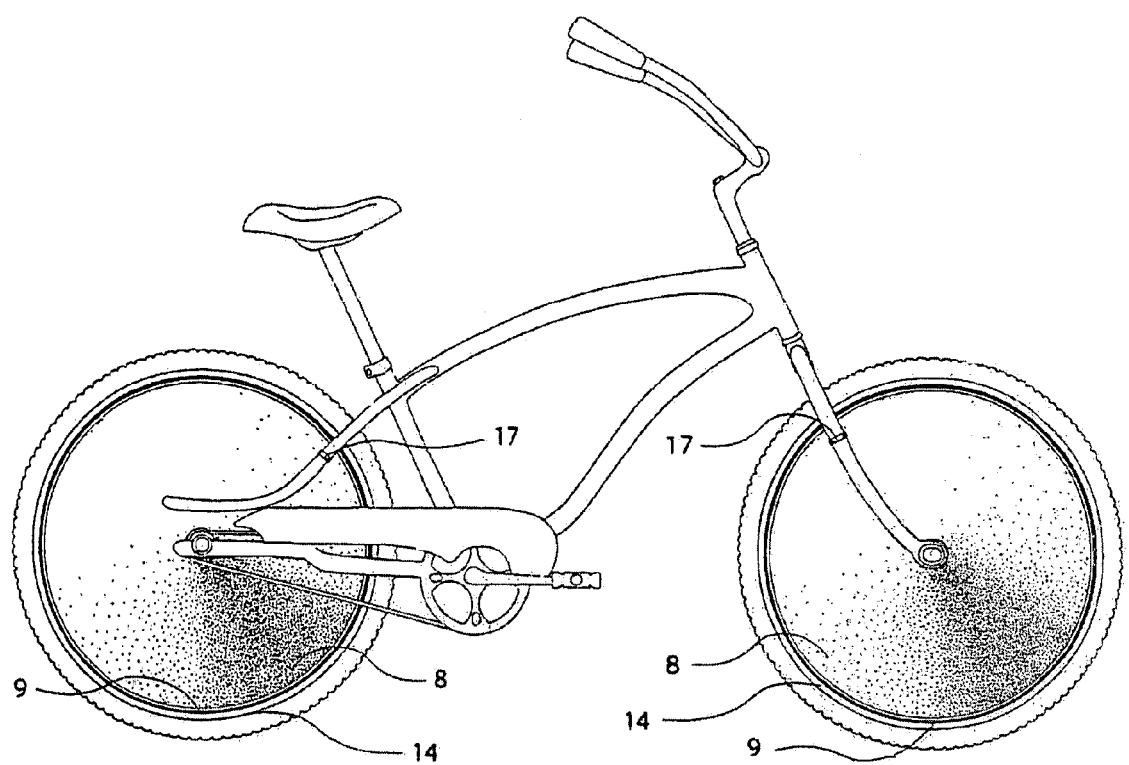
FIG. 8. is an elevation view of a typical bicycle showing front and rear application of bicycle wheel display disks.

Referring to FIG. 7, showing one half of the invention, the assembly consists of five major components; the base disk thermoformed from a polystyrene or PVC type of substrate with a turned up leading edge and a center hole to accept a bicycle wheel hub and skewer 15. A plurality of recessed holes 13 to attach to a like assembly via sonic welding or mechanical fasteners is also provided.

A beating assembly 12 is overmolded into base disk 9 and circular outer convex disk 8 at the time of forming. The bearing 12 is then attached to one another by simply pushing the two together as seen again in FIG. 6. The bearing enables the disk to turn freely with out wear or friction. A retaining mechanism made of PVC is mechanically fastened to the circular outer convex disk 8 and the bicycle frame member 16 to hold the outer disk in a ridged and upright position making the graphic readable at all times.

The invention claimed is:

1. A pair of non-rotating circular display assemblies enclosing a spoked portion of a bicycle wheel comprising:
    a pair of opposing inner circular base disks having raised outer circumference edges to abut a wheel rim, allowing a pair of outer convex disks to nest within said edges, said base disks utilizing notched portions on said edges to allow access for a bicycle lock to cross through said base disks said bicycle wheel, said notched potions directly opposing valve stem access holes inset from peripheries of said base disks;
    said based disks having centrally located holes extending outward creating a bearing stays and rigidity, where through a bicycle wheel hub passes;
    means for joining said base disks by aligning a plurality of recessed holes in said base disks between spoked portions of said bicycle wheel and attaching flat portions of said recessed holes via sonic welding or mechanical fasteners;
    said pair of outer convex disks having centrally located holes extending inward creating a bearing stays and rigidity, where through a bicycle wheel hub passes;
    two-part bearing assemblies constructed of opposing halves attached to corresponding obverse faces of said base disks and reverse faces of said outer convex disks;
    and adjustable retaining mechanisms attached to said outer convex disks on obverse peripheries to engage both said outer convex disks and bicycle frame members on opposing sides of a bicycle.

* * * * *